UNITED STATES PATENT OFFICE.

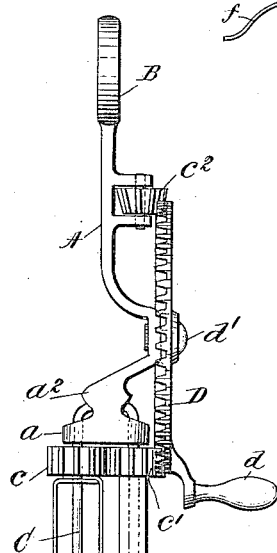
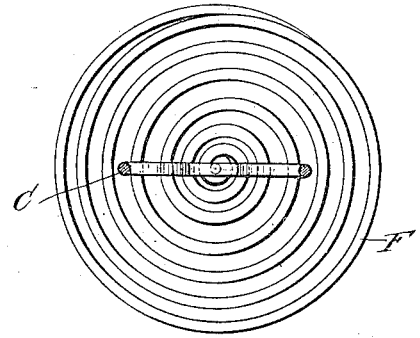
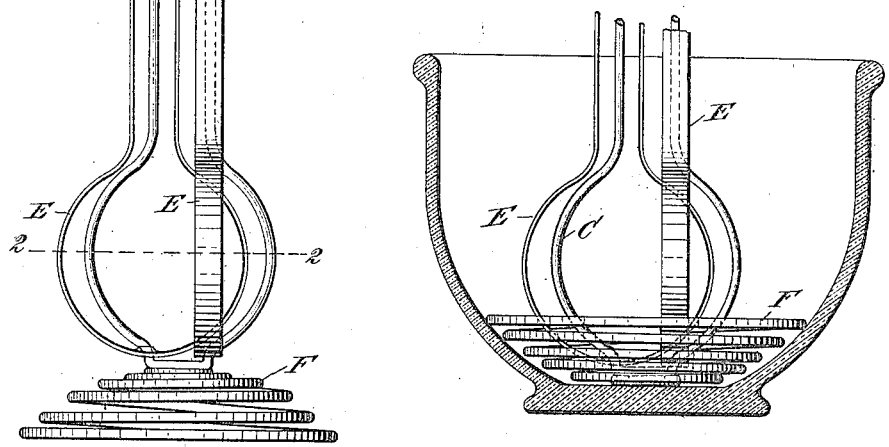
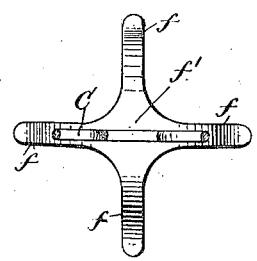

WARREN H. DUNNING, OF CAMBRIDGE, MASSACHUSETTS, ASSIGNOR TO DOVER STAMPING & MANUFACTURING COMPANY, OF PORTLAND, MAINE, A CORPORATION OF MAINE.

EGG-BEATER.

1,255,994.          Specification of Letters Patent.     Patented Feb. 12, 1918.

Application filed June 15, 1915. Serial No. 34,292.

*To all whom it may concern:*

Be it known that I, WARREN H. DUNNING, of Cambridge, in the county of Middlesex and State of Massachusetts, a citizen of the United States, have invented a new and useful Improvement in Egg-Beaters, of which the following is a specification.

My invention relates particularly to that class of egg beaters now well known in the trade as the "Dover" egg beater, *i. e.* one having one or more rotatable floats supported on a frame and connected by suitable gearing with a crank handle by which the float or floats are rotated.

It consists in an egg beater having a base stand of such a nature that the beater will not only have a stable foundation on which it may stand either in the bowl while in use or, when taken from the bowl, on the table or shelf, but also will adjust itself to any bowl or vessel with either a round or flat bottom even when the circumference of the base is larger than the circumference of the bottom of the bowl. The construction of the base stand is such that it serves to draw or suck up the ingredient to be beaten from the bottom of the dish between the wires to the beater floats and by reason of its flexibility may be used at an angle as well as in an upright position. The base stand is preferably of a diameter such as to serve as a protection to the floats as will be described below.

My invention will be understood by reference to the drawings in which—

Figure 1 is a side elevation of an egg beater embodying my invention.

Fig. 2 is a section on the line 2—2 of Fig. 1 showing the base in detail.

Fig. 3 is an elevation showing the operative portion of the device in a vessel the bottom of which is smaller in circumference than the base stand, the vessel being in section.

Fig. 4 is a plan showing in detail another form of base.

Fig. 5 is a view of the base in Fig. 4 attached to the frame.

A is a casting having at one end the handle B and at the other the crossbar $a$ through which the upper end of the frame C passes. D is a crown gear carrying a crank handle $d$. This gear is attached to the casting A by a rivet $d^1$ so that it is free to turn.

The wire frame C as shown is in the form of a loop the upper ends of which pass through the crossbar $a$ and into appropriate openings in the socket piece $a^2$ which forms a part of the casting. On the upper ends of the wire frame are mounted pinions $c$, $c^1$ which mesh and one of which meshes with the gear D. An idler pinion $c^2$ supported in the upper part of the casting steadies the gear D.

From each piston $c$, $c^1$ depends a float E of usual character which as usual in this type of beater is perforated at its lower end, the wire frame C running through the perforation and serving as a bearing for the lower end of each float.

To the lower portion of the loop of the frame C is attached by electric welding or otherwise a base stand F. As shown the base stand F is a wire helix slightly conical in construction and of circular shape. The frame C is attached to the innermost part of the spiral base as will be seen from Fig. 1. As shown the diameter of the base F is such that it projects farther from the axis of the frame than do the floats in their rotation so that if the base can enter the neck of a vessel the floats can enter and can be operated therein without injury or engagement with the side walls thereof and with a steady free movement due to the engagement of the base with the side walls of the vessel.

The advantages of this structure will appeal to the user of egg beaters. It is well known that with the ordinary egg beater the bottom being rounded serves as a very unstable support when the floats are in rotation so that in a round bottom bowl the beater tends to slip about and to make it extremely hard to obtain a smooth result, while the application of downward pressure does not help to steady it, but rather increases the instability and tendency to slip about. Moreover, when taken from the bowl the beater must be laid flat on the table or shelf or leaned against the wall.

My beater described above stands alone on the table or in the bowl; the floats are protected as above described, and as the base stand is a helix, when the beater is lifted from the vessel there is not the drainage necessary from a solid plate. The frame is thus made a sufficiently firm and stable structure which will stand alone and to which more or less pressure may be applied to hold it steady instead of the insecure footing formerly had. A slight pressure downward on the beater presses the center or apex of the base stand downward so that the center reaches the bottom of the vessel and the eggs or other ingredient comes through or between the wires and is thus sucked up by the rotation of the beater floats, and every particle is drawn up and agitated as no other base will allow. The construction is such that the beater may be used in a vessel of smaller circumference than that of the base stand as the flexibility of the spiral wire allows adjustment thereto by pressure (see Fig. 3). In addition this flexibility permits use of the beater at an angle with the same stability, and whereas the beater with the sheet metal base must be absolutely upright and rigid.

The shape and construction of the base stand may be different from that shown in Figs. 1, 2 and 3 so long as it will answer the purpose of affording a reasonably firm and yielding base for the beater. Such a modification is shown in Figs. 4 and 5 where the base stand comprises arms $f$ radiating from a center piece $f^1$. The arms are spring members and are preferably arranged so that the base is conical as before. When pressure is applied to the beater the base will be as yielding and flexible as in the other construction and at the same time present a reasonably firm support.

The mode of attachment to the frame may be different as well and yet be within the scope of my invention. As shown the beater is so attached as to be easily kept clean and is as sanitary as the beaters now in use. While I have used the "Dover" type of beater, I do not limit my invention to that particular style of beater.

What I claim as my invention is:—

A device as described comprising one or more floats, means for rotating them, and means for supporting them comprising a frame having a flexible base located at its lower end and substantially at right angles thereto, said base having an area wider than the projection of the space taken by the floats when rotated.

WARREN H. DUNNING.

Copies of this patent may be obtained for five cents each, by addressing the "Commissioner of Patents, Washington, D. C."